June 17, 1952 R. L. CRANE 2,601,095
HOLDER FOR BAND-SAW GUIDES
Filed May 10, 1950 2 SHEETS—SHEET 1

Inventor
Robert L. Crane
By his Attorneys
Merchant & Merchant

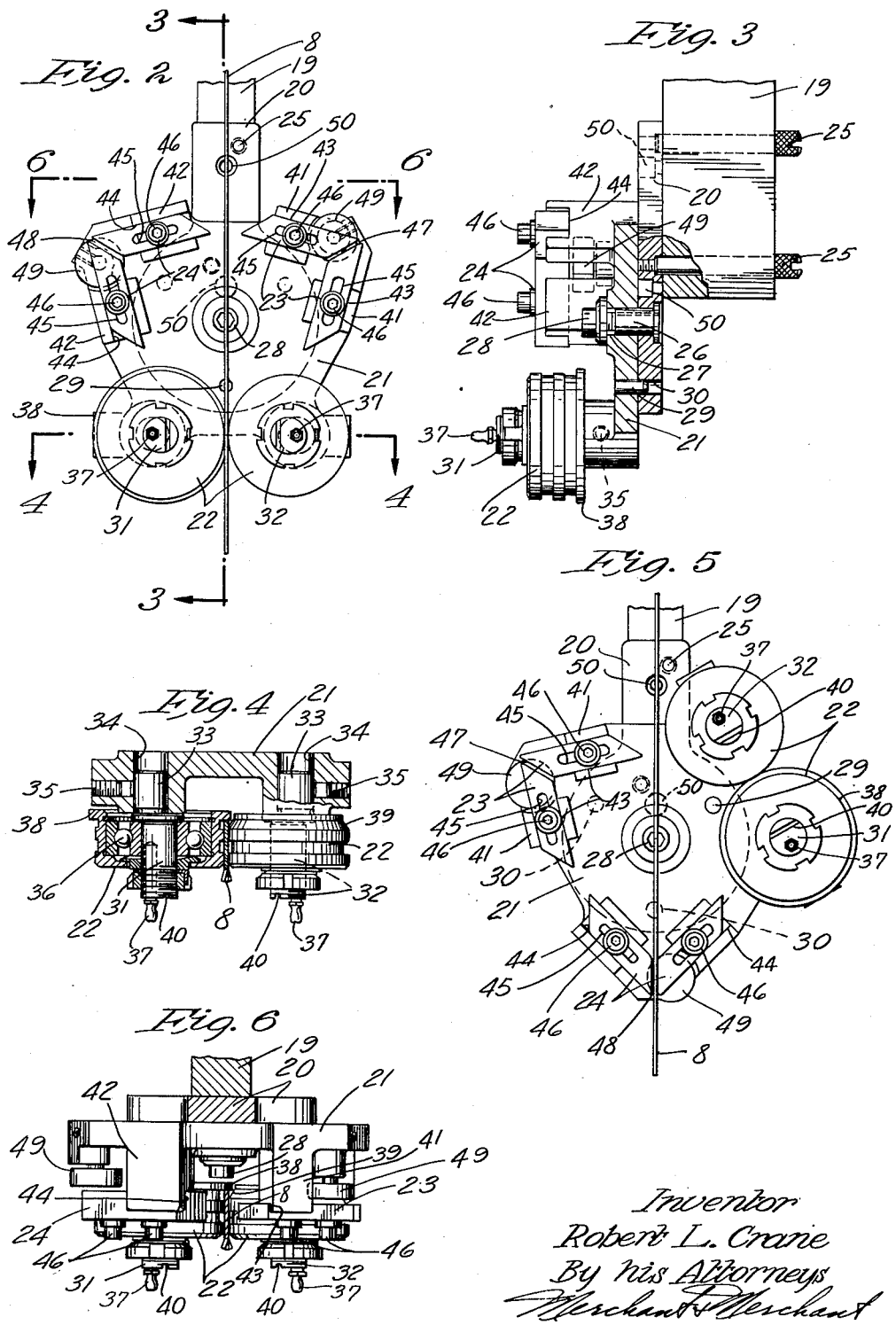

Patented June 17, 1952

2,601,095

UNITED STATES PATENT OFFICE 2,601,095

HOLDER FOR BAND-SAW GUIDES

Robert L. Crane, Glen Lake, Minn., assignor to Continental Machines, Inc., Savage, Minn., a corporation of Minnesota Application May 10, 1950, Serial No. 161,057

3 Claims. (Cl. 143—161)

My invention relates generally to band sawing machines, and more specifically to saw guides for band sawing machines.

An important object of my invention is the provision of guide means for band saw blades which may be quickly and easily adapted to receive and guide blades of various widths and thicknesses.

Another object of my invention is the provision of mounting means for a plurality of guides, as set forth, whereby a given saw guide may be readily moved into and out of saw blade guiding relationship in the path of travel of a saw blade.

Another object of my invention is the provision of a turret mounting a plurality of saw elements, rotation of said turret moving a selected pair of guide elements into and out of guiding relationship with the saw blade.

Another object of my invention is the provision of a turret of the above type having pairs of cooperating guide elements so spaced thereon that a saw blade guided by one pair of said elements will pass between other pairs thereof.

Another object of my invention is the provision of indexing means positively locking the above-mentioned turret against rotation when in guiding relationship with the saw blade.

Another object of my invention is the provision of a saw guide assembly, as set forth, which is compact and rugged in construction and efficient and durable in use.

Other highly important objects and advantages of my invention will become apparent from the following detailed specification, appended claims and attached drawings.

Referring to the drawings in which like characters indicate like parts throughout the several views:

Fig. 2 is an enlarged fragmentary detail in front elevation of one of the saw guides of my invention;

Fig. 3 is a fragmentary view, partly in side elevation and partly in section, taken substantially on the line 3—3 of Fig. 2;

Fig. 4 is a horizontal section, taken substantially on the line 4—4 of Fig. 2;

Fig. 5 is a view corresponding to Fig. 2, but showing a different position of some of the parts; and Fig. 6 is a view partly in plan and partly in section, taken substantially on the line 6—6 of Fig. 2.

Figure 1:
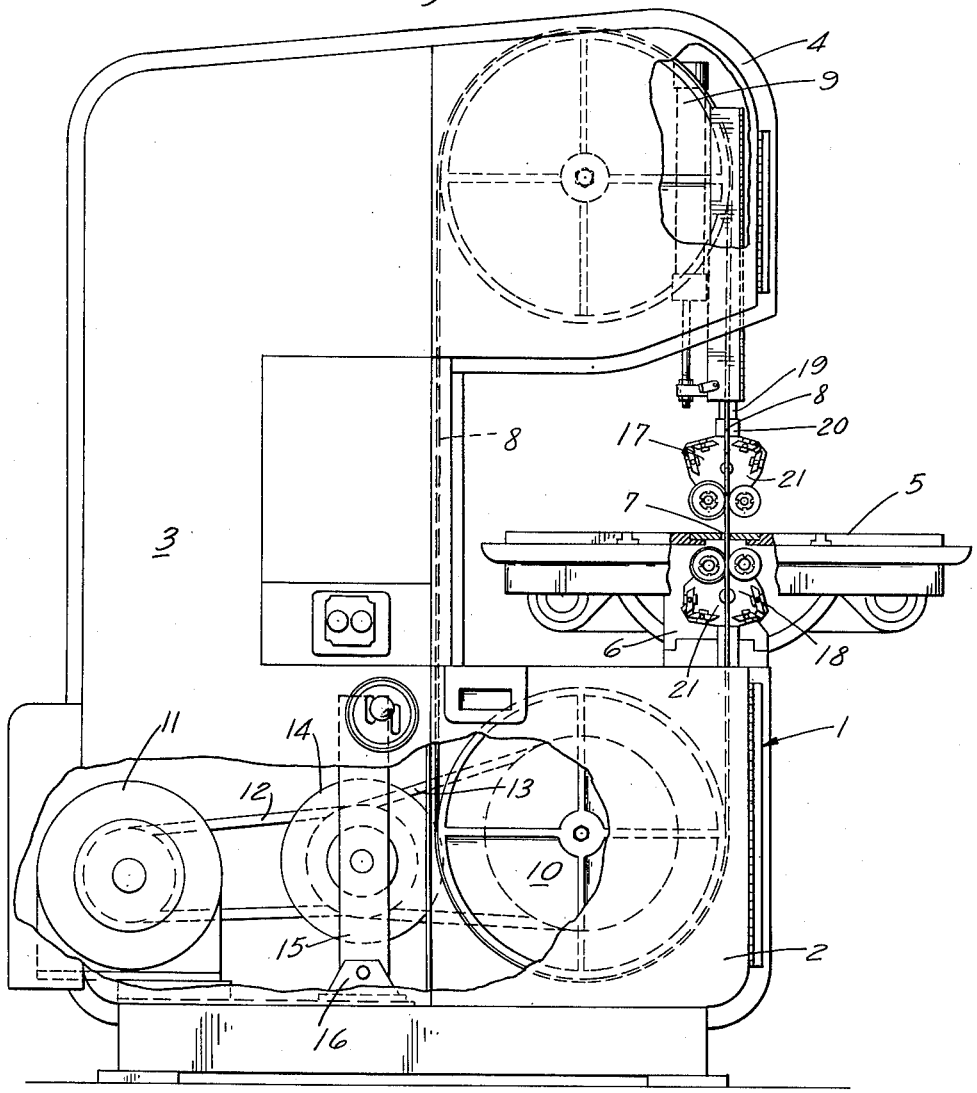
Fig. 1 is a view in front elevation of a band sawing machine incorporating my novel saw guiding means.

A band sawing machine is illustrated in Fig. 1 as comprising a frame structure 1 made up of a base 2, a generally vertical column 3 and a head 4. The head 4 overlies a projected portion of the base 2 in vertically spaced relation thereto, whereby to provide a working area therebetween. A work-holding table 5 is suitably mounted on a support 6 on the base 2 and is provided with a slot 7 through which extends one vertical run of an endless band saw blade 8. The blade 8 runs over a wheel 9 journalled in the head 4 and a drive wheel 10 mounted for rotation in the base 2. The wheel 10 is driven by a motor 11 through endless belts 12 and 13, a conventional variable speed pulley 14 and a gear transmission, not shown, but contained within the base 2. The variable speed pulley 14 is mounted for rotation on a swinging arm 15 having its lower end pivotally mounted on a bracket 16, welded or otherwise secured to the frame structure 1. The structure heretofore described does not form any essential part of the invention and it is thought that further detailed showing and description thereof is unnecessary.

For the purpose of guiding and supporting the saw 8 during the cutting operation, I provide upper and lower saw guides 17 and 18, respectively, the latter of which is secured to the table and the former of which is rigidly mounted on the lower end of a supporting post 19, which is rigidly mounted to and depends from the head 4. For the sake of brevity, inasmuch as the saw guides 17 and 18 are identical, only the saw guide 17 will be described in detail. The saw guide 17 comprises a mounting plate 20, a turret 21, and a plurality, as shown in 3, of pairs of saw guide elements 22, 23 and 24.

The mounting plate 20 is removably secured to the lower end of the post 19 by a pair of thumb screws or the like 25, and is provided with a stub shaft 26 projecting laterally outwardly therefrom, through a central aperture 27 in the turret 21. A washer-equipped clamping screw 28 had threaded engagement with a threaded opening extending axially through the stub shaft 26, whereby to hold the turret 21 against the mounting plate 20. For positively locking the turret 21 against accidental rotation with respect to the mounting plate 20, I provide an indexing pin 29 which projects rearwardly from the turret 21 and is adapted to be snugly slidably received in any one of a plurality of recesses or openings 30 in the mounting plate 20. As shown, there are three such openings 30, one each associated with one pair of saw-guide elements. With this arrangement, when the indexing pin 29 is aligned with and received in one of the openings 30, the pair of saw guide elements associated therewith are positioned in guiding relationship to the saw blade 8. From the above, it should be obvious that changing the turret from one position to another, whereby to use a different pair of saw guide elemnts, such as, for instance, changing the turret from its position of Fig. 2 to the position thereof shown in Fig. 5, it is but necessary to loosen the clamping screw 28 and move the turret 21 forwardly sufficiently to bring the indexing pin out of engagement with the opening 30, and thereafter manually rotate the turret to a point where the index pin is aligned with the opening 30 associated with the saw guide elements desired to be used. The turret is then locked in its new position, the index pin 29 being received into the opening 30 aligned therewith.

The pairs of saw guide elements 23 and 24 are structurally similar and differ from each other only in that they are designed to guide saw blades of different widths. The guide elements 22 are in the nature of rollers journalled on spaced parallel shafts 31 and 32, each of which has an eccentrically offset portion 33 seated in one of a pair of mounting holes 34 in the turret 21, and frictionally locked therein by said screws or the like 35. Anti-friction bearings 36 interposed between the guide roller elements 22 and their respective shafts 31 and 32 are furnished lubrication through conventional grease fittings 37, the grease fittings 37 and suitable grease passages in the shafts 31 and 32 communicating with the fittings and the bearings 36. As shown, one of the rollers 22 is formed with a radially outwardly projecting circumferentially-extended flange 38, which provides a back-up shoulder for the rear edge portion of the saw blade 8 (see particularly Figs. 2 and 4). The other of said rollers 22 is diametrically reduced at its rear edge portion, as indicated at 39 to provide working clearance for the flange 38. A pair of screw driver slots 40 at the outer ends of the shafts 31 and 32 permit insertion of a screw driver or similar tool to rotate said shafts when the said screws 35 are loosened, whereby to adjust the relative spacing of the rollers 22.

The saw guide elements 23 and 24 are in the nature of hardened metallic bars mounted and guided for sliding movements in bosses 41 and 42, respectively. The bosses 41 and 42 extend laterally forwardly from the body of the turret 21 and at their outer ends are provided with channels 43 and 44, respectively, which receive therein their respective saw guide elements 23 and 24. The saw guide elements 23 and 24 are provided with longitudinally-extending slots 45 through which extend washer-equipped clamping screws 46 that have screw-threaded engagement with the bosses 41, whereby to securely clamp the saw guide element-forming bars 23 and 24 in desired set positions. The bars 23 and 24 have their opposite ends beveled and are disposed in outwardly converging relationship, whereby to provide saw blade passages 47 and 48 respectively. A pair of back-up rollers 49 are journalled in the turret 21 on axes parallel to the axis of the stub shaft 26, the axis of rotation of the rollers 49 being laterally offset from their respective passages 47 and 48. By reference to Figs. 3 and 6, it will be noted that the saw guide elements 24 are of greater thickness than the guide elements 23 and that the roller guide elements 22 are of greater thickness than either the guide elements 23 or 24. This arrangement provides guiding means for saw blades of different widths, and the lateral adjustability of the several saw guide elements provides an adjustment for wear of the guide elements as well as for saw blades of different thicknesses.

By reference to Figs. 1, 2 and 5, it will be seen that the several pairs of saw guide elements 22, 23 and 24 are circumferentially spaced substantially equidistantly about the axis of the stub shaft 26, and that when one pair of saw guide elements is in guiding relationship to the saw blade 8, the saw passes between the other pairs of saw guide elements. This feature of my invention provides for an extremely compact arrangement of guides on the turret 21 and allows maximum visibility to the workpiece being operated upon by the saw blade 8. By reference to Figs. 2, 3 and 5, it will be seen that the mounting plate 20 is provided with a pair of spaced countersunk holes 50 through which screws may be inserted for mounting the same to the table support 6.

My invention has been thoroughly tested and found to be completely satisfactory for the accomplishment of the objectives set forth; and while I have shown a commercial embodiment of my novel device, it will be understood that the same is capable of modification without departure from the spirit and scope of the invention, as defined in the appended claims.

What I claim is:

1. A guide for band saws comprising an anchoring member, means for mounting said anchoring member to a band sawing machine, a turret pivoted at its central portion to said anchoring member, and a plurality of pairs of saw guide elements on said turret in circumferentially-spaced relationship about the pivot axis of the turret, each of said pairs of saw guide elements defining a guide channel having a closed bottom and opening outwardly in a direction generally parallel to the pivot axis of said turret.

2. A guide for band saws comprising an anchoring member, means for mounting said anchoring member to a band sawing machine, a turret pivoted at its central portion to said anchoring member, and a plurality of pairs of saw guide elements on said turret in circumferentially-spaced relationship about the pivot axis of the turret, each of said pairs of saw guide elements defining a guide channel having a closed bottom and opening outwardly in a direction generally parallel to the pivot axis of said turret, each of said guide channels being disposed to direct a saw blade received therein in a path extending between other of said pairs of saw guide elements.

3. A guide for band saws comprising an anchoring member, means for mounting said anchoring member to a band sawing machine, a turret pivoted at its central portion to said anchoring member, and a plurality of pairs of saw guide elements on said turret in circumferentially-spaced relationship about the pivot axis of the turret, each of said pairs of saw guide elements defining a guide channel having a closed bottom and opening outwardly in a direction generally parallel to the pivot axis of said turret, each of said guide channels being circumferentially spaced from an adjacent guide channel at angles less than 180° apart and disposed to direct a saw blade received therein in a path extending through the axis of said turret and between other of said pairs of saw guide elements.

ROBERT L. CRANE.

REFERENCES CITED

The following references are of record in the file of this patent:

UNITED STATES PATENTS

| Number | Name | Date |
|---|---|---|
| 934,893 | Depoy | Sept. 21, 1909 |
| 1,784,696 | Lehmbeck | Dec. 9, 1930 |
| 2,311,426 | Wilkie | Feb. 16, 1943 |

FOREIGN PATENTS

| Number | Country | Date |
|---|---|---|
| 364,558 | Italy | Nov. 9, 1938 |